United States Patent [19]

Parrish

[11] Patent Number: 4,594,233
[45] Date of Patent: Jun. 10, 1986

[54] PROCESS FOR MANUFACTURE OF AMMONIA

[76] Inventor: Roger W. Parrish, 11922 Stearns, Overland Park, Kans. 62213

[21] Appl. No.: 688,819

[22] Filed: Jan. 4, 1985

[51] Int. Cl.⁴ .................. C01C 1/04; C01B 2/02; C01B 2/30
[52] U.S. Cl. .................. 423/359; 423/360; 423/361; 252/373; 252/377
[58] Field of Search .................. 423/359, 360, 361; 252/377

[56] References Cited

U.S. PATENT DOCUMENTS

| | | | |
|---|---|---|---|
| 1,745,730 | 2/1930 | Uhde | 423/360 |
| 3,343,916 | 9/1967 | Cahn et al. | 423/359 |
| 3,349,569 | 10/1967 | Nebgen | 423/360 |
| 3,684,442 | 8/1972 | Konoki et al. | 423/359 |
| 4,255,406 | 3/1981 | Isalski et al. | 423/359 |
| 4,469,665 | 9/1984 | Pinto | 423/359 |

FOREIGN PATENT DOCUMENTS 0001324 4/1979 European Pat. Off. ............ 423/359

OTHER PUBLICATIONS

"New Separation Process Gives Cheaper Ammonia", Hydrocarbon Processing, Jul. 1972.

*Primary Examiner*—Andrew H. Metz
*Assistant Examiner*—Helane Myers
*Attorney, Agent, or Firm*—Robert J. Mawhinney

[57] ABSTRACT

An improved process for making synthetic ammonia wherein a make-up synthesis gas is added to recycled unreacted gas from a catalytic conversion loop including the steps of introducing a volatile anti-icing compound into the hot make-up gas to vaporize the compound, cooling the gas and vaporized anti-icing compound to condense part of the anti-icing compound, separating the condensed anti-icing compound and dissolved impurities from the make-up gas, further cooling the make-up gas to a temperature at which the remaining anti-icing compound condenses essentially completely, separating the condensed remaining anti-icing compound from the make-up gas, mixing the resulting make-up gas at the low temperature with liquid ammonia to saturate the make-up gas with ammonia, separating unvaporized liquid ammonia from the saturated make-up gas, mixing the saturated make-up gas with recycle and passing the mixed gases directly to the catalytic ammonia synthesis converter.

5 Claims, 1 Drawing Figure

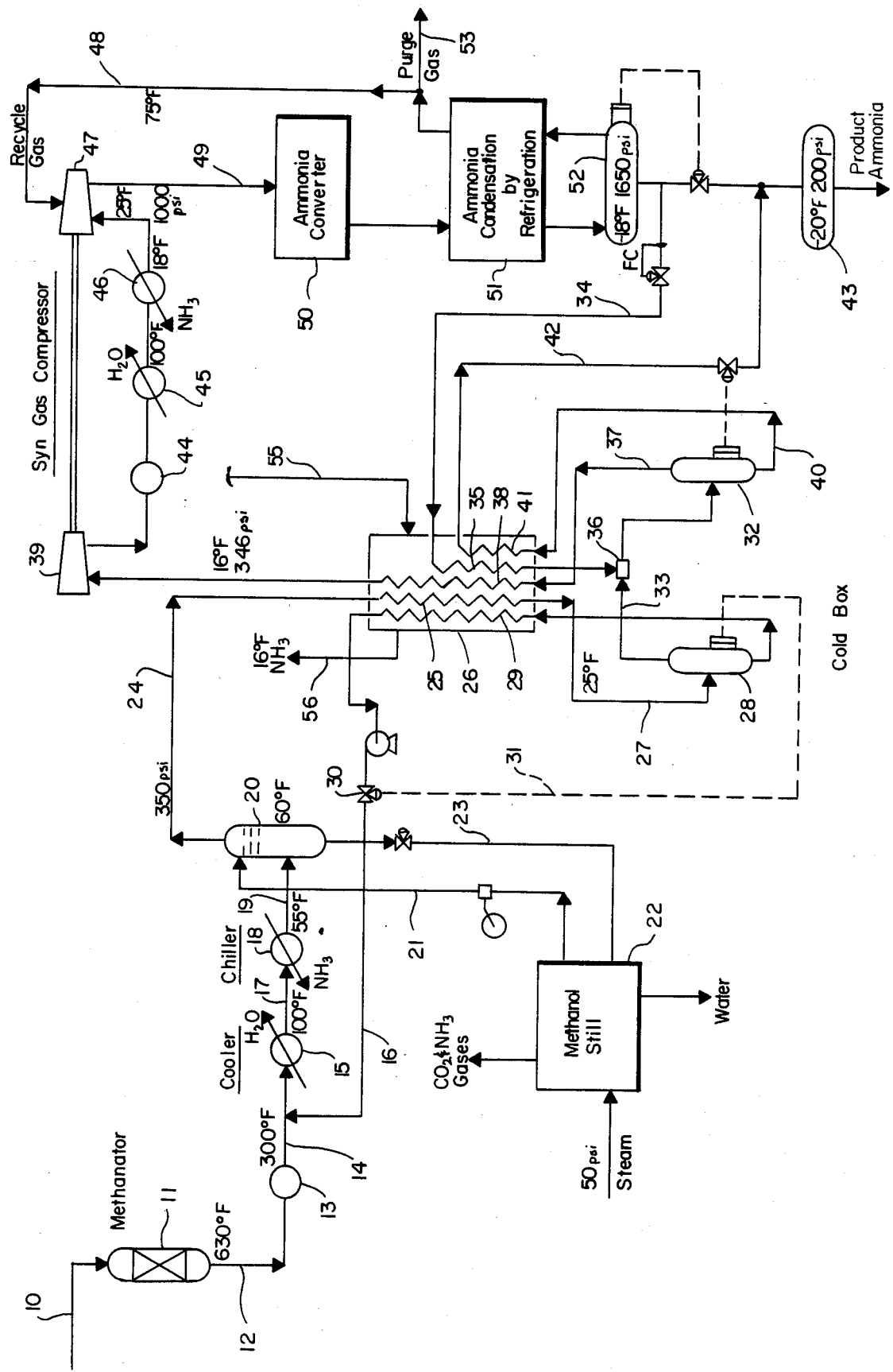

PROCESS FOR MANUFACTURE OF AMMONIA

BACKGROUND OF THE INVENTION

The present invention relates to an improved energy saving process for the manufacture of synthetic ammonia.

The ammonia synthesis feed gas produced by conventional hydrocarbon conversion processes contains objectionable quantities of carbon dioxide and water which adversely affect the ammonia conversion catalyst. The carbon dioxide content of the raw feed gas after reforming and shifting, is reduced by conventional alkaline or solvent scrubbing, but low level residual carbon dioxide after methanation, is still objectionable in the synthesis loop.

The conventional ammonia plant removes the remaining carbon dioxide and the water from the make-up gas by introducing the make-up gas into the ammonia loop after the catalytic synthesis converter and before the refrigerating system that condenses the product ammonia. The liquefying ammonia absorbs the carbon dioxide and water from the unreacted synthesis gas which is then recommended with recycled gas and passed to the converter.

It has also been proposed to remove water and residual carbon dioxide from the make-up gas by scrubbing with liquid ammonia as described for example in the patent to Nebgen, U.S. Pat. No. 3,349,569, or by using molecular sieve driers.

SUMMARY AND OBJECTS OF THE INVENTION

It is an object of the invention to provide an energy saving process for ammonia synthesis by purifying the make-up feed gas and reducing its volume.

Another object is to provide a system that can be installed readily in existing synthetic ammonia plants.

The present invention comprises an improved process employing ammonia saturation of a pre-dried synthesis feed gas at very low temperature in a saturator-dryer. The use of a low temperature, for example below $-50°$ F., in the saturator-dryer limits the amount of ammonia evaporated into the gas. This eliminates the need for any interstage ammonia condensation and renders the gas suitable for direct admission to the converter by introduction into the recycle gas stream.

To achieve the low temperature required in the saturator-dryer the feed gas must be essentially free of water and ammonium carbamate which forms from traces of ammonia in the presence of carbon dioxide. At the temperatures involved any components that produce solids will quickly shut down the plant.

In accordance with the invention, the make-up gas from the methanator is cooled in a water cooled heat exchanger to about 300° F. and saturated with a volatile anti-icing compound such as methanol, isopropanol or acetone. The saturated gas is further chilled to about 60° F. and washed with a further quantity of the liquid anti-icing compound. The unvaporized anti-icing compound containing a large part of the impurities (water, carbon dioxide, ammonia and dissolved ammonium carbamate) is separated from the gas and passed to a rectifying still to recover the anti-icing compound. The purified gas, now saturated with the anti-icing compound, is chilled with boiling liquid ammonia and by indirect heat exchange to a temperature of about $-75°$ F. which condenses the anti-icing compound and most of the remaining impurities. The condensed anti-icing compound is separated from the gas and returned to the saturator loop.

The purified gas, now at a temperature of about $-75°$ F., is introduced into a contact tower with liquid ammonia. The liquid ammonia removes the last traces of carbon dioxide and water and saturates the gas with ammonia vapor, providing the cold box cooling driving force. Due to the very low temperature the gas exiting the tower contains only about 0.7% ammonia when saturated. The cold gas is warmed to ambient temperature, preferably by indirect heat exchange with the incoming raw makeup gas, and compressed and added to the ammonia loop recycle gas entering the catalytic converter. The make-up gas is fed to the compressor at substantially the pressure that the raw make-up gas has leaving the methanator but by reason of the lower temperature is a denser gas requiring less compression energy to raise it to ammonia catalytic converter operating pressure. Alternatively, the same compression equipment and energy can achieve higher capacity. Whereas a typical ammonia loop operates with a recycle gas proportion of 4.5 volumes to 1 volume of make-up gas, the present invention permits 3.5 volumes of recycle to 1 volume of make-up gas.

The preferred process of the invention employs a multi-path heat exchanger or cold box which is of particular advantage in applying the invention to existing synthetic ammonia plants which have limited available ground space. The cold box approach provides for low cost shop preassembly techniques lowering costs through increased manpower efficiency.

BRIEF DESCRIPTION OF THE DRAWING

The invention will be described with reference to the drawing which is a flowsheet of an ammonia plant incorporating the invention.

DETAILED DESCRIPTION OF THE INVENTION

Synthesis gas from conventional hydrocarbon conversion enters through line 10 into the methanator 11 and passes through line 12 into the boiler feed water heater 13. The gas which leaves the methanator 11 at about 630° F. is cooled to about 300° F. in the boiler feed water heater 13. The gas then passes through line 14 to a cooling water heat exchanger 15. Volatile anti-icing compound, preferably methanol, is introduced into the line 14 from the methanol recycle line 16 or from a fresh methanol supply source, where the volatile compound is completely vaporized into the gas stream. For an ammonia plant production of about 1150 tons per day the methanol requirement to treat the make-up synthesis gas is about 1 gallon per minute. The gas and vaporized anti-icing compound are cooled in the water cooled heat exchanger 15 to about 100° F. and are passed through the line 17 to an ammonia cooled chiller 18 which reduces the temperature of the gas stream to about 55° F. The chilled gas passes by line 19 into contact tower 20 where it is washed countercurrently with additional liquid anti-icing compound introduced through line 21 from the recovery still 22. Unvaporized anti-icing compound is collected at the bottom of the contact tower 20 and returned through line 23 to the recovery still 22. The collected anti-icing compound contains a large part of the carbon dioxide, water, ammonia and dissolved ammonium carbamate from the synthesis gas stream.

The partially purified synthesis gas, saturated with the volatile anti-icing compound, leaves the upper part of the contact tower 20 through the line 24 and enters flow path 25 of the multipath heat exchanger 26 where it is cooled by indirect exchange with boiling ammonia to about 25° F. Cooling of the incoming synthesis gas to 25° F. is provided for by ammonia refrigerant introduced into the exchanger 26 through the line 55 as a liquid and exhausted through line 56 as a vapor. The incoming synthesis gas is cooled further to about −75° F. in path 25 by indirect heat exchange principally from the ammonia saturated gas stream 37 passing through the path 38 of the multi-path exchanger 26. The cold gas and condensed anti-icing compound leave the heat exchanger 26 through line 27 and enter separator 28. Condensed anti-icing compound is removed from the bottom of separator 28, passed through the flow path 29 of the exchanger 26 to recover the cooling energy in the liquid by heat exchange with a portion of the incoming synthesis gas. The condensed anti-icing compound contains most of the impurities that remained in the synthesis gas stream entering the separator 28. The stream of condensed anti-icing compound warmed by heat exchange in path 29 is returned to the incoming fresh synthesis gas stream through the line 16 or is sent directly to the recovery still 22. The liquid level in the separator 28 is maintained by the level controlling valve 30 and its control signal line 31. At the cold operating temperature of the de-icing compound separator 28, the vaporization losses of the de-icing compound will be very small, of the order of a few gallons per day for a commercial plant. In fact, methanol the preferred de-icing compound is a minor contaminant in the synthesis gas having been produced during the shift reaction. The very low temperature separation in the separator 28 will prevent loss of the now produced methanol into the synthesis gas, reducing the requirement for purchased methanol.

Synthesis gas from separator 28 passes from the separator to saturator 32 through line 33. Liquid ammonia is drawn from ammonia product recovery through line 34 and heat exchanger path 35 and introduced into the synthesis gas stream in line 33 through the mixing device 36. In the mixing device 36 and in the saturator-separator 32 the liquid ammonia saturates the synthesis gas with ammonia which passes from the upper portion of the saturator through line 37 and heat exchanger path 38 of the heat exchanger 26 to the first stage synthesis gas compressor 39.

The mixture of synthesis gas and liquid ammonia entering the saturator-separator 32 is at a temperature of about −83° F. This temperature is possible because of the exhaustive drying and purification of the raw synthesis gas upstream of the saturator. As a result of the low temperature the synthesis gas stream picks up only about 0.6 to 0.7% ammonia. The synthesis gas stream leaving the saturator-separator 32 through line 37 is warmed in the heat exchanger 26 by indirect heat exchange with the incoming synthesis gas in path 38 to a temperature of about 16° F. There is a very low pressure drop in the purification and saturation operation. The synthesis gas, after the first washing in contact tower 20, enters the heat exchanger at about 350 pounds per square inch pressure. After the chilling and saturation the gas leaving the heat exchanger and entering the first stage compressor 39 is at about 346 pounds per square inch pressure. The low temperature and maintained pressure substantially reduce the mechanical load on the synthesis gas compressor resulting either in lower mechanical energy demand or increased compression capacity to expand ammonia plant production capacity.

The unvaporized ammonia liquid from the saturator 32 is drawn off through line 40 and passed through path 41 of the heat exchanger to recover cooling energy in indirect heat exchange with ammonia in path 35. From the heat exchanger path 41 the ammonia is returned through line 42 to the ammonia product degassing and collection drum 43.

Compressed synthesis gas from first stage compressor 39 is passed through interstage atmospheric cooler 44, water cooled heat exchanger 45 and ammonia cooled chiller 46 to the second stage compressor 47 where it is combined with recycle gas introduced through line 48 from the ammonia loop. With the interstage gas now dried and freed of contaminants there is no reason to limit the temperature of the interstage gas from chiller 46 and it can be lowered consistent with available plant refrigeration levels. The combined gas stream is passed through line 49 to the catalytic converter 50. The low ammonia content of the make-up synthesis gas and its freedom from water and carbon dioxide renders the mixed gas stream suitable for direct introduction into the catalytic ammonia synthesis converter 50.

The downstream steps for the reordered loop after the catalytic converter are the conventional refrigerated condensation of ammonia indicated at 51 in the flowsheet, the loop separator at 52 where unreacted synthesis gas and inert gases are separated from the liquid ammonia and the let-down or degassing drum 43 where the liquid ammonia is reduced in pressure for delivery to product storage. A purge gas stream is indicated at 53 in the recycle line 48 in accordance with standard practice.

In conventional ammonia plates the synthesis loop equipment represented by blocks 50 and 51 in the flowsheet are reversed in flow order. Advantages in energy saving achieved by the present invention are obtained by reordering the flow in blocks 50 and 51 as shown in the flowsheet.

About 10% of the produced liquid ammonia from the conventional ammonia loop separator 52 is used in the process. A portion of the washing ammonia evaporates into the synthesis gas in the saturator 32 and is the principal source of the low temperature cooling for the whole process.

This whole gas purifying system can be assembled in a compact space to be insulated by a loose fill in a cryogenic cold box. The box is purged with dry nitrogen or $CO_2$ to prevent ambient moisture infiltration.

There are a number of advantages flowing from the process of the invention. The process has a gas (synthesis feed gas) and a liquid (ammonia) feed that both return at substantially the same pressure at which they enter. The driving force for the cold box to function is the evaporation of a portion of the subcooled liquid ammonia into the feed gas.

The synthesis feed gas is cooled before it enters the ammonia loop compressor thus saving more compression energy than the process costs in ammonia refrigeration work.

Due to the low temperature and pressure at which the feed gas is washed in the saturator-dryer the make-up feed gas to the ammonia loop has an ammonia content of the order of 0.6 to 0.7%. At present most of the installed ammonia plants purify the make-up feed gas by mixing it with the converter effluent at loop pressure of the order of 2100 psi and refrigerating the mixed gas to condense ammonia product. Water and carbon dioxide are removed by solution in the condensed ammonia. However, under the pressure and temperature conditions of this conventional operation the converter feed contains about 2.0% ammonia. This means that the recycle gas ammonia content is reduced to about 2% but the make-up gas is saturated to about 2% ammonia. In accordance with the present invention the convertor feed will contain about 1.7% ammonia. Synthesis converter performance is enhanced due to the lowered feed gas ammonia content.

In accordance with the present invention the recycle gas volume is reduced by the ammonia product condensed before the compressor. The reordered loop allows the gas compressor discharge pressure to be lowered and still operate the converter at the same pressure. The pressure drop of the loop is reduced because: (a) the feed gas does not pass through the various product condensers, reducing their mass flow and pressure drop, (b) the converter feed ammonia content is lower allowing a reduced recycle ratio. By not diluting the converter effluent with feed gas, the product condenses easier and shifts heat load from lower temperature levels to higher levels saving horsepower. The sensible heat of the make-up gas is saved also unloading chiller duties.

Instead of performing the drying and ammonia saturation of the make-up synthesis gas before the first compression stage of the ammonia cycle the drying and saturation can be performed after the first compression stage and before the final compression stage. This location is of particular advantage where the methanation step is performed at the synthesis gas compressor interstage instead of performing the methanation before the compression. The mechanical advantage in the first compression stage is lost in this alternative but the advantage of lower volume of gas is preserved in the later compression stage. Also the load on the ammonia refrigeration equipment is relieved in contrast to the conventional cycle where the synthesis gas make-up is purified by passing throught the refrigeration equipment before reaching the catalytic converter.

While this invention has been described in conjunction with a particular embodiment thereof, it will be understood that it is capable of further modifications, and this application is intended to cover any variations, uses, adaptations of the invention following in general the principals of the invention and including such departures from the present disclosure as come within known or customary practice in the art to which the invention pertains, and as may be applied to the essential features hereinbefore set forth and followed in the scope of the invention or the limits of the appended claims.

What is claimed is:

1. An improved process for making synthetic ammonia wherein a make-up synthesis gas is added to recycled unreacted gas from the catalytic conversion loop including the steps of introducing a volatile anti-icing compound into the hot make-up gas to vaporize the compound, cooling the gas and vaporized anti-icing compound to condense part of the anti-icing compound, separating the condensed anti-icing compound and dissolved impurities from the make-up gas, further cooling the make-up gas to a temperature at which the remaining anti-icing compound condenses essentially completely, separating the condensed remaining anti-icing compound from the make-up gas, mixing the resulting make-up gas at the low temperature with liquid ammonia to saturate the make-up gas with ammonia, separating unvaporized liquid ammonia from the saturated make-up gas, mixing the saturated make-up gas with recycle and passing the mixed gases directly to the catalytic ammonia synthesis converter.

2. The process of claim 1 wherein the volatile anti-icing compound is methanol.

3. The process of claim 1 wherein the saturation of the make-up gas with ammonia is carried out at a temperature sufficiently low to restrict the ammonia content of the saturated gas to about 0.7%.

4. A process for treating make-up synthesis gas for a synthetic ammonia catalytic converter, said gas containing objectionably high concentrations of water vapor and carbon dioxide, which comprises vaporizing into the said gas a volatile anti-icing compound, cooling the said gas and anti-icing compound to a temperature substantially below the ice point to condense the anti-icing compound and dissolved water and carbon dioxide, separating the condensed anti-icing compound and dissolved water and carbon dioxide from the said gas, and washing the cold separate gas at a temperature substantially below the ice point with liquid ammonia to remove residual anti-icing compound and remaining traces of carbon dioxide and water.

5. The process of claim 4 wherein the temperature of the cold separated gas washed with liquid ammonia is maintained below $-50°$ F. to limit the amount of ammonia evaporated into the gas.

* * * * *